United States Patent Office 3,416,631
Patented Dec. 17, 1968

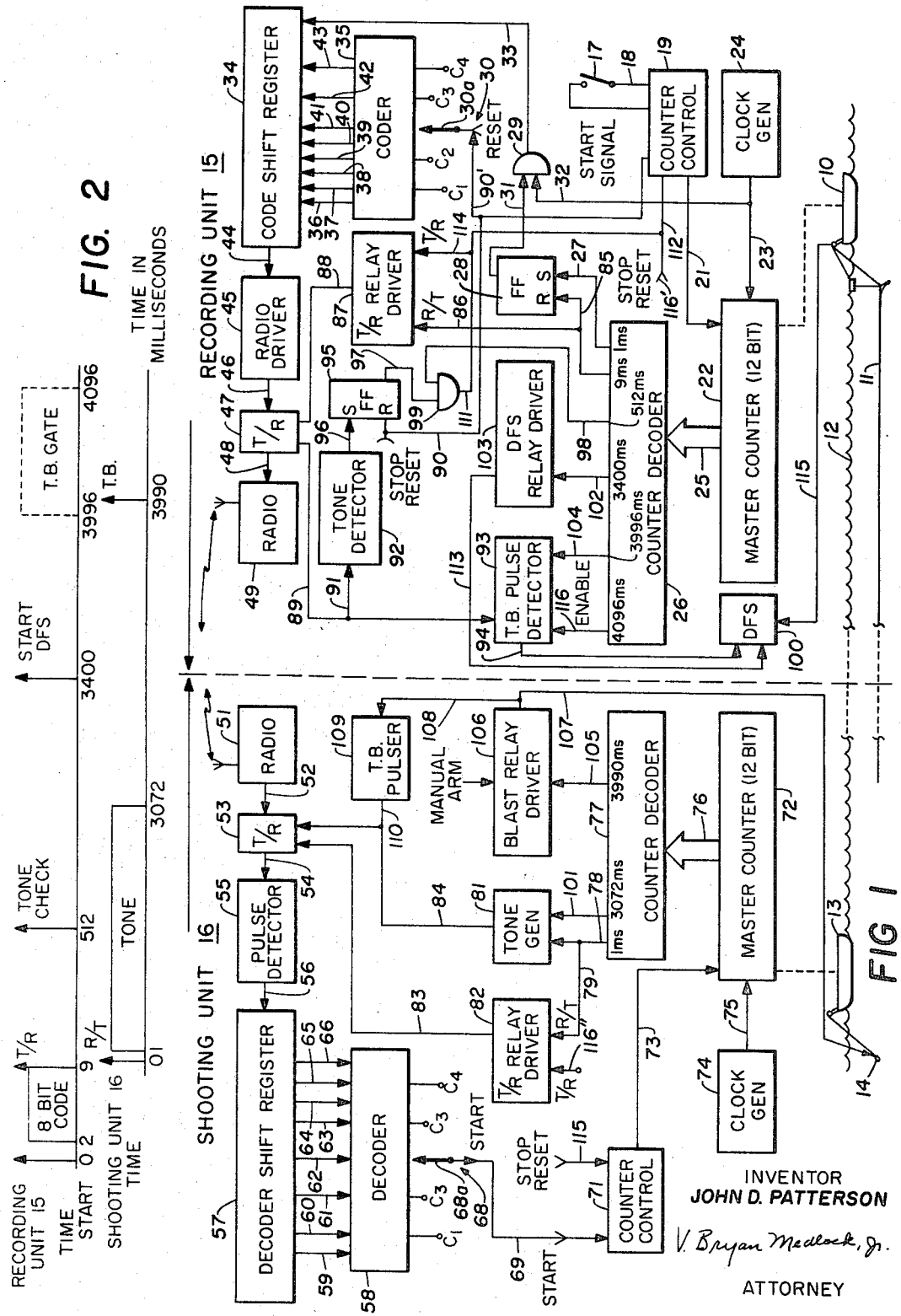

3,416,631
DIGITAL REMOTE FIRING SYSTEM
John David Patterson, Arlington, Tex., assignor to Texas Instruments Incorporated, Dallas, Tex., a corporation of Delaware
Filed Dec. 30, 1966, Ser. No. 606,428
6 Claims. (Cl. 181—.5)

ABSTRACT OF THE DISCLOSURE

A digital system for controlling the actuation of a generator of seismic energy at a firing station which is located remote from a recording station is described. The firing station and recording station are linked by a two-way radio transmission link so that a first source at the recording station can transmit a first binary coded signal to the firing station. If the firing station receives the binary coded signal from the recording station, the firing station will transmit a tone signal. The tone signal from the firing station, if detected, at the recording station will permit enabling of the seismic signal recording means. Timing means at the firing station will effect actuation of the generator of the seismic energy in a predetermined time relationship with respect to generation of the first binary coded signal in the recording station. If the binary coded signal from the recording station is not received by the firing station in its properly coded form, no tone signal will be transmitted by the firing station and logic means at the recording station will initiate a repeat of the transmission of the first binary coded signal.

FIELD OF THE INVENTION

The invention relates to seismology, and more particularly to a system for controlling the actuation of a generator of seismic energy, such as a dynamite charge, by transmission of signals between a firing station and a recording station.

THE PRIOR ART

Various systems have been employed to detonate or actuate means for generating seismic energy. In marine exploration for example, one vessel is generally used to carry and/or handle a seismic energy generator, such as a dynamite charge, a gas exploder, electric arc device, or the like. A second vessel tows a streamer of detectors, such as hydrophones, which detect reflected or refracted seismic waves and transmit signals proportional to the intensity of the waves to signal recording means aboard the vessel from which the hydrophones are towed. For proper analysis of the recorded signals, it is necessary to know when and where the seismic energy was generated. One prior system for determining the time at which the energy was generated involved radio communication between the firing station or vessel and the recording station or vessel. The recording station transmitted a signal to the firing station. When the signal was received at the firing station, the generator of seismic energy was manually armed to fire at a pre-arranged time after receipt of the observer's signal. The equipment actuating the generator also generated a signal which was transmitted by radio back to the recorder vessel and this signal, the timebreak signal, was recorded on the seismogram.

With the above system, an operator in charge of manually arming the device would not respond with precision, and the desired firing-recording coordination was not always achieved. With the advent of tape and drum recording and digital field systems, it became necessary to fire the charge at a very precise moment and record only the true timebreak, so the above system was inadequate.

A later developed system operates as follows. An operator at a recording station ascertains by voice communication with the operator at the firing station that the firing station is ready. At this time the recording station sets a control which turns on a transmitter to modulate a VHF emission with a tone of approximately 1800 cycles/second. The operator at the firing station upon hearing the tone, manually arms the seismic energy generator, which usually is a dynamite charge. After the tone has been transmited for 3 to 5 seconds, the recording station starts its firing sequency by starting a tape transport. This action turns off the tone oscillator and the recording station transmitter. Termination of the tone at the firing station closes a relay which turns on a transmitter at the firing station and actuates a time delay circuit. After approximately 600 milliseconds the time delay circuit closes another relay to fire the shot.

When the shot is fired the transmitter at the firing station and the receiver at the recording station are both "on." A timebreak pulse from the blaster modulates the shooter's transmitter and the modulated signal is received at the recording station where it is channeled through a pulse shaping circuit to the timebreak input of the recording instruments. The pulse shaping circuit is gated "on" 500 milliseconds after the start of the firing sequence so that any pulse caused by switching of the transmitters at the firing and recording stations will be blocked and not be presented to the instruments as a timebreak.

Most failures of the above system have been attributed to poor communications. If during the time that the recorder is in the "tone position" and the seismic wave generator is armed, communications are interrupted for any reason, such as fading of the signal, squelch clamps, a burst of static, transmissions from another station, or an attempt by an operator on the recording vessel to cancel the shot by voice communication with the firing station, a premature detonation might result. Thus, at any time during the 3 to 5 second period when a tone is being sent from the recording station and the recording equipment is switched off, a premature detonation can be caused by interference detected by the receiver at the firing station.

SUMMARY

The present invention provides a system for more positive control of the actuation of a seismic wave generator. A recording unit transmits a coded signal to the firing unit. The signal is decoded at the firing unit to actuate the firing mechanism. Thus, if during transmission of the coded signal any interference is received, the decoder at the firing station will not permit actuation of the seismic energy generator and a premature detonation will be avoided. If the coded signal is received without interference, the decoder in the firing unit will initiate generation of a signal which is transmitted to the recording unit to inform the recording unit that the coded signal has been received and that the firing sequence is started. Timing means at the firing station are enabled by receipt of the coded signal to control the timing of the firing sequence. Thus, at a predetermined time after transmission of the signal from the firing unit, the seismic wave generator is actuated and the timebreak signal is transmitted to the recording station where it is detected and recorded. Logic means are provided in the recording unit to retransmit the coded signal if a tone is not generated by the firing unit within a predetermined time after transmission of the coded signal to the firing unit.

THE DRAWINGS

To be more specific, reference is made to the drawings, in which:

FIGURE 1 is a schematic drawing of one embodiment of the invention; and

FIGURE 2 is a diagrammatic illustration of the timing sequence of the equipment illustrated in FIGURE 1.

THE PREFERRED EMBODIMENTS

With reference to FIGURE 1, a recording vessel 10 tows a streamer 11 of seismic detectors, such as hydrophones, at a predetermined depth below the surface of water 12.

Remote from vessel 10 is a shooter's boat 13 that tows a source of seismic energy, such as a dynamic charge 14. Vessels 10 and 13, in a conventional manner are maintained in a spaced apart predetermined relationship so that seismic waves generated by actuation of charge 14 and reflected from subsurface reflecting horizons will be detected by streamer 11.

In order to assure positive control over firing of charge 14 and recording of the time break signal in conjunction with signals received by streamer 11, vessel 10 carries a seismic recording and communication unit 15. Vessel 13 carries a complementary seismic firing and communication unit 16.

Recording unit 15

Recording unit 15, in one embodiment, includes the elements shown in FIGURE 1 and is based upon the adoption and use of means to form and transmit an 8-bit code for keying the recording unit 15 to the shooting unit 16 and coordinating action therebetween.

In the recording unit 15, a counter control 19 is actuated by closing switch 17 in channel 18. Counter control 19 is connected by way of channel 21 to a 12-bit master counter 22. Master counter 22 through channel 25 communicates with counter decoder 26. Counter decoder 26, through channels 27 and 85, communicates with the "set" and "reset" terminals, respectively, of flip-flop 28, the output channel 31 of which comprises one input to AND gate 29. The second input to AND gate 29 is by way of channel 32 which transmits clock pulses from clock generator 24 as does channel 23 which communicates with master counter 22. The output terminal of AND gate 29 communicates through channel 33 with code shift register 34, which also receives signals from a coder 35 by way of channels 36–43. The output of coder 35 may be selected by adjustment of arm 30a of rotary switch 30 to a selected one of the inputs $C_1$–$C_4$. Code shift register 34 through channel 44 communicates with radio driver 45, which through channel 46 and transmit-receive switch 47 and channel 48 drives radio 49. Returning to counter decoder 26, the output channel 85 of counter decoder 26 communicates by way of channel 86 with transmit-receive relay driver 87, the output of which through channel 88 also communicates with transmit-receive switch 47.

Transmit-receive switch 47 through output channel 89 communicates with time break pulse detector 93 and through channel 91, connected to channel 89, with tone detector 92, the output of which is transmitted through channel 96 to the "set" input of flip-flop 95, the reset input of which communicates through channel 90 from counter control 19. Channel 90 has a branch channel 90′ which communicates with switch 30 of coder 35 for resetting the coder 35. Timebreak pulse detector 93 also receives signals through channels 104 and 116 from counter decoder 26. Output channel 97 of flip-flop 95 serves as one input to AND gate 99, the other input of which is received through channel 98 from counter decoder 26. The output of AND gate 99 communicates through channel 111 with input channel 114 of transmit-receive relay driver 87 and channel 112 of counter control 19. A manual stop and reset 116′ is also provided for counter control 19. While the counter control 19 is normally reset by switch 116′ and flip-flop 95 is reset by a button designated "stop and reset" in the drawing, both counter control 19 and flip-flop 95 could be simultaneously reset by a single switch, not illustrated, such as a double pole, double throw switch thus eliminating the need for two switches.

Counter decoder 26 also communicates by way of channel 102 with digital field system relay driver 103, the output of which through channel 113 communicates with digital field system 100. The digital field system 100 also receives signals through channel 115 from the streamer 11 and through channel 94 from timebreak pulse detector 93.

The equipment described above, as explained before, cooperates and is keyed with the equipment in shooting unit 16, described hereafter.

Shooting unit 16

Shooting unit 16, in one embodiment, includes a radio 51 which communicates with transmit-receive switch 53, pulse detector 55 and decoder shift register 57 through channels 52, 54 and 56, respectively. Decoder shift register 57 through channels 59–66 provides an input to decoder 58 which is provided with a rotary switch 68, arm 68a of which may be contacted with either of the contacts $C_1$–$C_4$. Rotary switch 68, through channel 69, communicates the output received through one of the selected channels $C_1$–$C_4$ to counter control 71 which is provided with a manually actuatable stop and reset input 115. Counter control 71 communicates with master counter 72 by way of channel 73, and master counter 72 also receives signals from clock pulse generator 74 through channel 75. Master counter 72 through channel 76 provides the input to counter decoder 77, the output channel 78 and 101 of which communicate with a tone generator 81. Channel 78 from counter decoder 77 also communicates by way of channel 79 with one input of a transmit-receiver relay driver 82 which can also be manually actuated through channel 116″. The output of transmit-receive relay driver 82 is impressed upon transmit-receive switch 53 through channel 83. Tone generator 81 also communicates with transmit-receive switch 53 through channel 84. Counter decoder 77 also through channel 105 communicates with blast relay driver 106 the output of which through channel 108 communicates with time break pulser 110 and through channel 107 communicates with the generator of seismic energy 14. Time break pulser 109 also communicates through channel 110 with transmit-receive switch 53.

In operation when a seismic record is to be made, an operator on the recording vessel 10 closes switch 17 to actuate counter control 19. Counter control 19 then enables master counter 22 to initiate counting of pulses received at the rate of, for example, 1000 pulses/second by way of conductor 23 from clock pulse generator 24. The output of the flip-flops in the master counter 22 are communicated through conductor 25 to a counter decoder 26. Upon receipt of the 1 millisecond code by counter decoder 26 (1 millisecond after actuation of counter control 19) counter decoder 26 alters the signal in conductor 27, as from a logic 0 state to a logic 1 state, setting a flip-flop 28 and impressing a voltage on an AND gate 29 through its input conductor 31. The second input conductor 32 to AND gate 29 is supplied by clock generator 24. When flip-flop 28 is in the logic 1 state, AND gate 29 is enabled to pass pulses through conductor 33 to actuate code shift register 34. Thus, the pulses in conductor 33 will start 2 milliseconds after actuation of counter control 19.

Prior to actuation of counter control 19, the operator of the recorder station adjusts arm 30a of rotary switch 30 to a selected one of the inputs $C_1$–$C_4$ of a coder 35 to introduce an 8-bit code into code shift register 34. Each of the inputs $C_1$–$C_4$ will impress a different 8-bit code on code shift register 34, for reasons that will be described hereafter.

Upon receipt of the first pulse through conductor 33, code shift register 34 begins to serially read the 8-bit code into a radio driver 45 over channel 44. The code is at a bit rate of 1-bit per millisecond under the influence of the 1000 p.p.s. signal from generator 24.

Transmit-receive switch 47 is initially placed in the "transmit" position by the operator. Radio driver 45, through channels 46 and 48 modulates the VHF emission of radio 49 to transmit the binary code derived from coder 35. The binary coded signal from radio 49 is received by radio 51 in the firing unit 16 where it will be transmitted through channel 52, transmit-receive switch 53, and conductor 54 to pulse detector 55. Pulse detector transmits the pulses by way of channel 56 into decoder shift register 57.

Upon receipt of the 8-bits, decoder shift register 57 impresses either a logic 0 or logic 1 signal in each of the channels 59–66, depending upon the code used. Channels 59–66 transfer this information to decoder 58. Arm 68a of the decoder switch 68 is set to the same contact as switch arm 30 in firing unit 15. If the code is properly received, decoder 58 will send a signal through channel 69 to counter control 71.

Counter control 71 actuates master counter 72 through channel 73 upon receipt of a signal from decoder 58. Master counter 72 is driven by a clock generator 74 which is connected thereto by a channel 75. Clock generator 74 drives master counter 72 at the rate of 1000 pulses per second. The outputs of the flip-flops in the master counter 72 are communicated by way of conductor 76 to counter decoder 77. Counter decoder 77 upon receipt of the binary code corresponding to 1 millisecond from master counter 72 sends a signal by way of conductors 78 and 79 to actuate a tone generator 81 and a transmit-receive switch driver unit 82. The signal on conductor 79 closes the relay in transmit-receive driver unit 82 which is coupled by conductor 83 to alter transmit-receive switch 53 to the transmit state. The signal on conductor 78 actuates a tone generator 81 to send a signal by way of conductor 84. The latter signal is transmitted through transmit-receive switch 53 and conductor 52 into radio 51.

The transmit-receive switch 47 in the recording unit 15 has been changed to the receive state by a signal on channel 86, to permit reception of the tone signal from the firing unit 16. More specifically, upon receipt of the 9 millisecond code from master counter 22, a logic 1 will appear on channels 85 and 86. This resets flip-flop 28, thus de-actuating code shift register 34 and simultaneously actuating transmit-receive relay driver 87. Driver 87, upon receipt of a pulse on conductor 86 actuates transmit-receive switch 47 through conductor 88 to place it in a receive state.

Thus, the tone transmitted by radio 51 and received by radio 49, passes by way of conductor 48, transmit-receive switch 47 and conductors 89 and 91 to tone detector 92 and time break detector 93, respectively. Time break pulse detector 93 has not previously been enabled, thus receipt of the tone signal will not alter any output on conductor 94. Detection of tone signals from the firing station by tone detector 92 actuates flip-flop 95 by way of conductor 96 altering the logic output of flip-flop 95, for example from a logic 1 state to a logic 0 state. Counter decoder 26 sends a signal on channel 98, of the logic 1 level, 512 milliseconds after actuation of counter control 19. If the tone from radio 51 detected by tone detector 92 has switched the signal in conductor 97 to the logic 0 state, then there will be no output from AND gate 99. While the tone is checked 512 milliseconds after actuation of counter control 19, it could be checked at a different time since the tone from radio 51 will be transmitted for 3.071 seconds. Specifically, counter decoder 77 will, 3.072 milliseconds after actuation of counter control 71, transmit a signal through conductor 101 turning off tone generator 81, which was actuated by the 1 millisecond code.

Meanwhile, in the recording unit 15, counter decoder 26 3.400 seconds after actuation of counter control 19, transmits a signal on channel 102 to start a digital field system relay driver 103, which is in turn connected to conventional digital field system 100 through conductor 113. A digital field system such as described in U.S. Patent 3,134,957 issued to Foote et al. is suitable for this purpose. After actuating driver 103, counter decoder 26 sends a signal on channel 104 at 3.996 seconds to enable time break pulse detector 93. Counter decoder 77 at the firing station, at 3.990 seconds after actuation, sends a signal on channel 105 to blaster relay driver 106 which has been manually armed by the firing unit operator during transmission of the tone from unit 16. Upon receipt of the signal through conductor 105, driver 106 will transmit a signal on channel 107 to fire charge 14 and actuate time break pulser 109. Pulser 109 transmits a pulse through conductor 110, transmit-receive control 53, conductor 52, radio 51, conductor 48, transmit-receive switch 47, and conductor 89 to time break pulse detector 93, upon receipt of the time break pulse, sends a signal through conductor 94 to the digital field system 100 which will record the timebreak and signals from streamer 11, in a conventional manner. The timebreak pulse detector 93 is de-actuated by a signal through channel 116 from counter decoder 26.

Should the binary coded signal from the recording uint 15 become garbled due to interference, decoder 58 will not send a signal through conductor 69. Absence of such signal will prevent generation of the tone by tone generator 81. If the recording unit tone detector 92 does not detect a tone, then the logic state in conductor 96 is maintained at logic 0 state and the output of the flip-flop 95 will be in the logic 1 state. Thus, upon the receipt of the 512 millisecond pulse through conductor 98, AND gate 99 will create a logic 1 state at its output conductor 111 which communicates with driver 87 and the input conductor 112 of counter control 19. A logic 1 signal in conductor 111 will break the relay in transmit-receive relay and driver 87, driving transmit-receive switch 47 to the transmit state. A logic 1 input to counter control 19 through conductor 112 stops counter control 19 and resets it to commence re-transmission of the 8-bit code to radio 49. Resetting of counter control 19 sends a signal through channels 90 and 90' to reset flip-flop 95 and coder 35, respectively. Since switch 17 is preferably closed by contacts on a drum (not illustrated) conventionally used in connection with the field recording system, the 8-bit code will again be transmitted when the drum is rotated to the point where the contacts on the drum again close. This order from the drum will be about four seconds before the drum reaches the point where the time break is to be received, since the time break will be received four seconds after actuation of counter control 19, as illustrated in FIGURE 2.

*Time sequence*

As illustrated by the top chronology line in FIGURE 2, which represents the recording unit time, an 8 bit code is transmitted from the recorder unit 15 at the rate of 1 bit per millisecond between 2 and 9 milliseconds after actuation of counter control 19. The radio 49 of the recording unit 15 during this transmission period, is of course in the transmit state. With reference to the bottom chronology line of FIGURE 2, the master counter 72 of shooting unit 16 will be actuated approximately 1 millisecond after receipt of the 8 bit code, and will commence transmission of a tone by means of tone generator 81 commencing about 1 millisecond after actuation. The tone signal will continue until de-actuation of tone generator 81 by the 3.072 second pulse from counter decoder 77. During generation of the tone signal, referring again to the top line of FIGURE 2, recorder unit 15 will, 512 milliseconds after its actuation, check to determine if the tone is being transmitted from shooting unit 16. The tone may be checked since radio 49, 9 milliseconds after actuation of recording unit 15, has been switched to the receive state permitting tone detector 92, through flip-flop 95, to enable the output of AND gate 99 for receipt of the 512 millisecond pulse through channel 98 from counter decoder 26.

Recording unit 15, 3.400 seconds after actuation, will start the digital field system with the 3.400 second pulse through channel 102 from counter decoder 26. After 3.996 seconds, time break pulse detector 93 will be enabled, thus "gating" the time break circuit for receiving the time break from shooting unit 16 which transmits the time break 3.999 seconds after actuation, which will be approximately 4 seconds after actuation of recording unit 15. The time break pulse detector is disabled through channel 116 by a 4.096 second pulse from counter decoder 26 to close the time break gate.

From the description of the above embodiment, it will be obvious that there is provided with a remote firing system which will prevent premature actuation of the seismic energy source since the code transmitted by the control station must be received in the proper form before the generator will be actuated. If the code is not received in proper form, the recording unit 15 includes logic means which reset the equipment for re-transmission of the code.

While a code having 8 bits is preferred, a code having a lesser or greater number of bits may be used, and indeed a different time sequence could be employed but the described time sequence is preferred. Additionally, since the recorder station may work with more than one firing station, the coder 35 is adapted to transmit any one of four codes, depending upon the position of rotary switch 30a. Of course each of the firing stations will set rotary switch 68 on its decoder 58 to receive only the code to be transmitted to that station.

The coded signal may be made in a form other than that of a binary code, but the latter is preferred. Also, the signal transmitted by the shooting unit 16 need not be an audible tone signal, but an audible signal is preferred, as it can be monitored by the shooting unit 16 to permit the operator to manually arm the blast relay driver during its approximately 3 second duration. The coded signal should be long enough to lower the probability of any noise pattern duplicating the code. For this reason, an 8 bit code has been selected because the probability of noise duplicating the code is, for all practical purposes, zero.

While rather specific terms have been used to describe a preferred embodiment of the invention, they are not intended, nor should they be construed, as limitations upon the invention as defined by the following claims.

I claim:

1. A system for controlling the actuation of a generator of seismic energy at a firing station located remote from a recording station, which comprises:
   (a) a two way transmission link between the firing and recording stations and;
   (b) a first source at said recording station for transmitting a first coded signal to said firing station;
   (c) a second source of a signal at said firing station;
   (d) decoding means at said firing station responsive to said coded signal from said recording station to actuate said second source;
   (e) signal recording means at said recording station;
   (f) detector means at said recording station responsive to said second signal to enable said signal recording means, and
   (g) timing means at said firing station for actuating said generator in predetermined time relation with respect to generation of said first coded signal.

2. The combination set forth in claim 1, wherein logic means at said control station initiates a repeat of said first coded signal in the absence of reception of said second signal from said firing station.

3. The combination set forth in claim 1 wherein said first source at said control station includes:
   a coder;
   a code shift register adapted to receive a binary code from said coder and upon receipt of an actuating signal serially transmit said code through the transmission link between said control station and said firing station.

4. The combination of claim 3, wherein said firing station includes:
   a pulse detector in communication with the transmission link betwen said stations for receiving said coded signal from said first source;
   a decoder shift register for serially receiving the coded signal;
   and a decoder for receiving said code from said decoder shift register and generating an output signal upon receipt of a predetermined code, and
   means responsive to the output signal of said decoder for generating a second signal.

5. The combination of claim 4, including logic means at said conrtol stations for initiating a repeat of the first coded signal in the absence of reception of the second signal from the firing station.

6. The combination of claim 5, including means for storing a plurality of 8 bit codes; and means for selecting one of said stored codes for transmission from said recording station.

References Cited

UNITED STATES PATENTS 2,910,133  10/1959  Hudson et al. _____ 181—.5

BENJAMIN A. BORCHELT, *Primary Examiner.*

T. H. WEBB, *Assistant Examiner.*

U.S. Cl. X.R.

340—15